United States Patent [19]
Mix et al.

[11] Patent Number: 5,326,655
[45] Date of Patent: Jul. 5, 1994

[54] BATTERY TERMINAL

[75] Inventors: Renard E. Mix; Tony E. Key, both of Yorktown, Ind.

[73] Assignee: General Motors Corporation, Detroit, Mich.

[21] Appl. No.: 57,925

[22] Filed: May 7, 1993

[51] Int. Cl.⁵ .............................................. H01M 2/02
[52] U.S. Cl. .................................... 429/178; 429/182
[58] Field of Search ............. 429/178, 179, 182, 180, 429/181

[56] References Cited

U.S. PATENT DOCUMENTS

| | | | |
|---|---|---|---|
| 1,108,883 | 9/1914 | Bijur | 429/178 |
| 1,594,486 | 8/1926 | Baldwin | 429/178 |
| 2,002,099 | 5/1935 | Schilke | 429/178 |
| 2,066,597 | 1/1937 | West | 429/178 |

OTHER PUBLICATIONS

Commercial Heavy Duty Battery Manufactured by GM (see attached drawing).

*Primary Examiner*—John S. Maples
*Attorney, Agent, or Firm*—Lawrence B. Plant

[57] ABSTRACT

A corrosion- and vibration-resistant battery terminal including a connector portion comprising a tin-coated, creep-resistant metal blade having a lead collar embedding one end thereof and receiving a battery terminal post therein.

8 Claims, 2 Drawing Sheets

BATTERY TERMINAL

This invention relates to a battery terminal particularly for lead-acid traction batteries.

BACKGROUND OF THE INVENTION

Lead-acid traction batteries are ganged together in packs and used to power electric vehicles. Batteries in such packs require terminal connections which have very low electrical resistance and are not susceptible to loosening due to vibration or poor properties of the materials used to make such connections. Conventional battery terminals have not proven to be successful in satisfying these electric vehicle battery requirements. Such earlier terminals have typically coupled the cable connector directly to a lead-based component of the battery terminal e.g., via a bolt, clamp or other means. The tightness of such connections progressively deteriorates as the metallurgical creep of the lead results in a loosening of the connection which, in turn, increases the electrical resistance at the connection and allows corrosion to build up at the interface between the cable connector and the battery terminal. The problem is further accelerated due to the vibrations vehicular batteries are exposed to. Inasmuch as electric vehicle packs contain a plurality of individual batteries electrically joined together by a significant number of cable-battery connections throughout the battery pack, the additive effect of the resistance at each terminal is significant, and improved terminal connections are required to minimize the voltage and $I^2R$ losses that can occur in a battery pack incident to these additive resistances.

Accordingly, it is an object of the present invention to provide an improved terminal for a traction-type, lead-acid storage battery which terminal provides a low resistance coupling between a cable connector and the battery, which coupling remains tight, secure and substantially corrosion free at the electrical interface between the cable connector and the terminal. This and other objects and advantages of the present invention will become more readily apparent from the description thereof which follows.

BRIEF DESCRIPTION OF THE INVENTION

The invention comprehends a corrosion and vibration resistant battery terminal including a terminal post projecting outboard the battery container, and a connector engaging the post which connector comprises a creep-resistant metal blade having an aperture at one end receiving the terminal post, and means on the other end for coupling the blade to a cable connector. The blade comprises a low electrical resistance material such as nickel, iron, aluminum, titanium or, preferably, copper. Reference herein to these or other metals is intended to include not only the pure metals but alloys based thereon. The blade is coated with tin, or a tin alloy (e.g., Sn-Pb) to promote bonding of the one end of the blade to a lead-based component of the connector and to provide corrosion resistance to the other end of the blade coupled to the cable connector. A lead-based alloy collar is bonded to and embeds the one end of the blade and has an opening therein for receiving the terminal post. More specifically, the connector is manufactured by positioning the Sn-coated blade in a mold having a cavity conforming to the shape of the collar and injecting the lead-based alloy thereabout to form the collar. The tin coating promotes wetting of the blade by the lead alloy for enhanced bonding of the lead alloy to the blade and results in tin enrichment of the collar-forming alloy in the region of the collar contiguous the blade. In one embodiment, the coupling means, at the other end of the blade, comprises a threaded rod anchored to the other end of the blade and projecting from that face thereof which is destined to engage the cable connector. In a most preferred embodiment, the threaded post extends completely through the blade and the root thereof is embedded in lead alloy cast about, and bonded to, the backside of the blade opposite the face that engages the cable terminal. In this embodiment, the threaded rod may conveniently comprise the shank of a bolt and the root thereof comprises the head of the bolt. Another feature of the present invention includes at least one (preferably several) lug extending radially outward from the terminal post to engage a complementarily-shaped recess in the collar for preventing rotation of the collar with respect to the terminal post. The collar is preferably spaced from the battery container wall by an insulating washer and fused to the terminal post at the same time that the terminal post is connected to the innards of the battery.

DETAILED DESCRIPTION OF A SPECIFIC EMBODIMENT

The invention will better be understood when considered in the light of the detailed description of a specific preferred embodiment thereof which is given hereafter in conjunction with the several figures in which.

Figure 1:
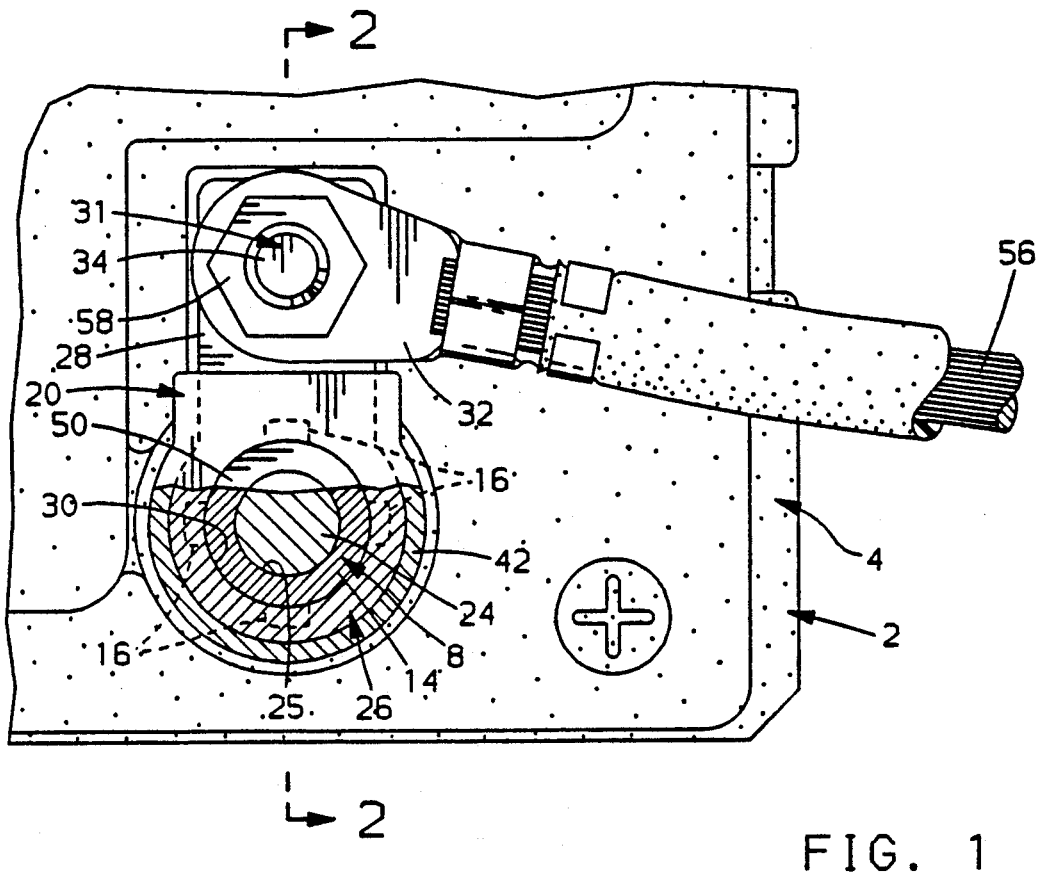
FIG. 1 is a plan view of a battery terminal in accordance with the present invention.
Figure 2:
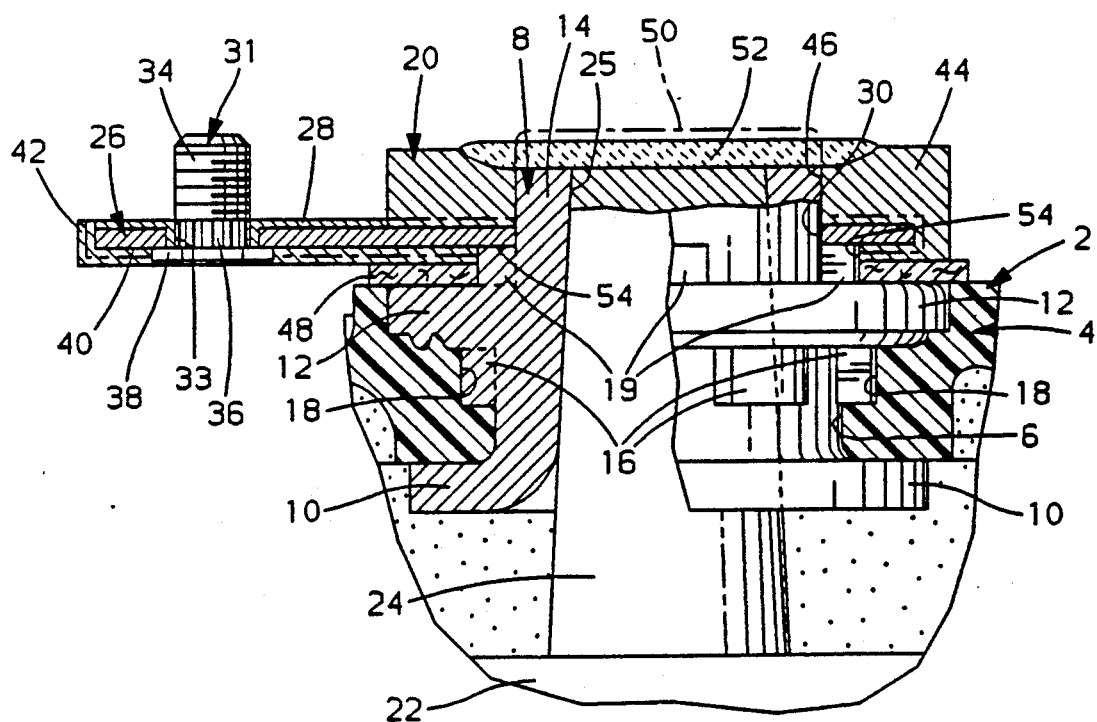
FIG. 2 is a view in the direction 2—2 of FIG. 1 (sans the cable)
Figure 3:
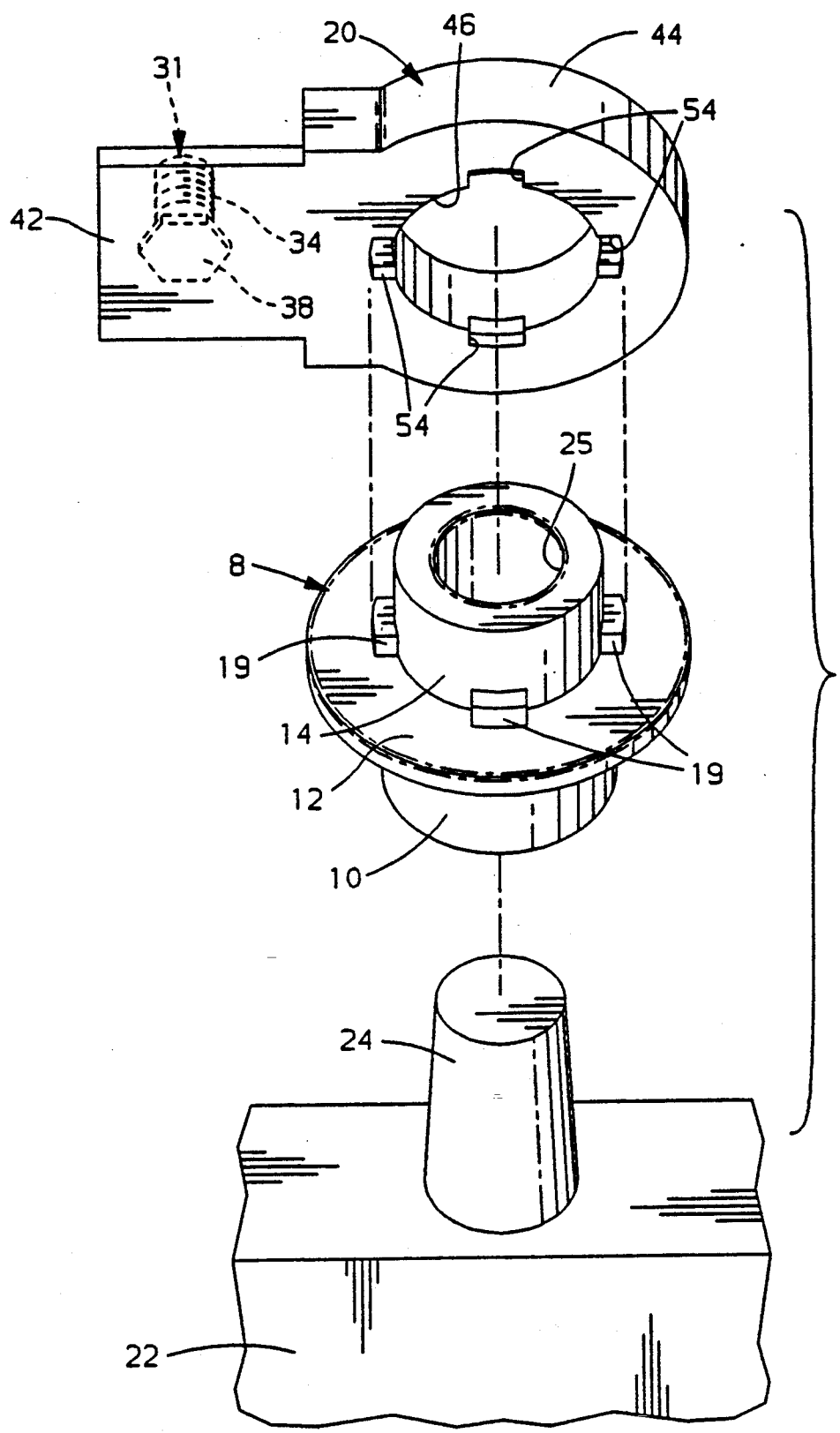
FIG. 3 is an exploded, perspective view of the several components comprising the battery terminal of the present invention.

The Figures show a battery container 2 including a cover 4 having an opening 6 therein. A terminal bushing 8 is positioned in the opening 6 and spin riveted over on the underside 10 thereof in a manner well known in the art. The bushing 8 includes a flange 12 extending radially outwardly from a central, tubular portion 14 which forms the battery's terminal post. The flange 12 is seated on the cover 4 and forms a tight seal therewith when the lower portion 10 is riveted over to sandwich the cover 4 between the flange 12 and the riveted over portion 10. Several anti-twist lugs 16 are provided on the underside of the flange 12 to engage recesses 18 formed in the battery cover 4 to prevent rotation of the bushing 8 with respect to the cover 4. Similarly, several anti-twist lugs 19 extending radially from the post 14 are provided atop the flange 12 to prevent rotation of a connector 20 with respect to the post 14.

The electrochemical innards 22 of the battery (i.e., alternately interspersed opposite polarity plates and interplate separators) are connected to the bushing 8 via a terminal post 24 which mates with the opening 25 in the post portion 14 of the bushing 8. The connector 20 comprising a creep-resistant metal blade 26 (preferably comprising copper or alloys thereof) has (1) a tin-based alloy coating 28 thereon, (2) an aperture 30 therein for receiving the post 14 on one end thereof, and (3) coupling means 31 on the other end thereof for connecting the blade 26 to a battery cable connector 32. The coupling means 31 may comprise nothing more than a hole 33 through which a bolt may pass, or may include an internally threaded socket adapted to receive a bolt passing through the terminal connector 32 and screwed into the socket. Preferably, and as shown in the Figures, the coupling means comprises a threaded rod 34 secured within the opening 33 (i.e., by splines 36). Preferably the rod 34 will be the shank of a bolt having a head 38 secured to the underside 40 of the blade 26 and embedded in lead alloy 42 bonded to the underside of the blade 26 and cast about the head 38 at the same time as the collar is cast about the other end of the blade. In this regard, the end of the blade 26 having the aperture 30 therein is embedded in a lead/lead alloy collar 44 having an opening 46 therein, which is coaxial with the opening 30, and also receives the terminal post 14. The collar 44 is preferably cast about the end of the blade 26 by positioning the blade 26 in an appropriate mold and injecting molten lead/lead alloy into the mold about the blade 26. The tin coating 28 on the blade 26 promotes wetting and bonding of the molten metal lead to the blade 26 and results in tin enrichment of the alloy contiguous the blade 26.

In assembling the connector 20 to the post 14 a porous, felt-like insulating washer 48 is sandwiched between the collar 44 and the flange 12/cover 4. The washer 48 preferably comprises a polyester felt which is initially saturated with water. After the collar 44 has been positioned over the post 14, heat (e.g., from a gas torch) is applied to the upper surface 50 of the stud-post-collar assembly so as to cause the post 24, post 14 and collar 44 to fuse together all at the same time, as illustrated at 52. The water in the washer 48, as well as the washer itself, insulates and protects the upper surface of the flange 12 and cover 4 from the heat of the fusing operation which could otherwise be deleteriously transmitted thereto through the collar 44. The post 14 includes radially extending lugs 19 which mate with recesses 54 formed in the underside of the collar 44, and serve to prevent rotation of the connector 20 with respect to the post 14.

When coupling the battery to another battery in an electric vehicle battery pack, a flexible, coupling cable 56, having a cable connector 32 thereon, is secured to the blade 26 by means of nut 58 engaging the threaded rod 34. This tightly engages the cable connector 32 with the upper face of the blade 26 providing a tight, low resistance connection therebetween which does not loosen due to vibration or because of metallurgical creep in either of the metals comprising the blade 26 or cable connector 32. Maintenance of such a tight joint serves to prevent the build-up of high-resistance, corrosion products at the interface between the blade 26 and connector 32.

While the invention has been disclosed primarily in terms of specific embodiments thereof it is not intended to be limited thereto, but rather only to the extent set forth hereafter in the claims which follow.

The embodiments of the invention in which an exclusive property or privilege is claimed are defined as follows:

1. A corrosion-resistant and vibration-resistant battery terminal comprising a terminal post projecting outboard a battery container and a connector engaging said terminal post, said connector comprising:
   a creep-resistant metal blade having an aperture through one end receiving said terminal post, means on the other end for coupling said blade to a battery cable connector, and a tin-based coating covering said other end;
   a Pb-based alloy collar bonded to and embedding said one end of said blade, said collar having an opening therein which receives said terminal post wherein said alloy is richer in tin contiguous the blade than elsewhere in the collar.

2. The terminal as claimed in claim 1 wherein said coupling means comprises a threaded rod anchored to said other end of said blade and projecting from a first face of said blade for engaging said cable connector.

3. The terminal as claimed in claim 2 wherein said rod is part of a bolt having a head which is at least partially embedded in Pb alloy bonded to a second face of said other end opposite said first face.

4. The terminal as claimed in claim 1 wherein at least one lug extends radially outwardly from said post, and said collar has at least one recess receiving said lug for preventing rotation of said collar with respect to said post.

5. The terminal as claimed in claim 1 wherein said collar is fused to said post.

6. The terminal as claimed in claim 1 wherein said coupling means comprises an internally threaded socket.

7. The terminal as claimed in claim 1 wherein said post has an annular flange extending radially therefrom and overlying a surface of said container, and a porous washer sandwiched between said flange and said collar.

8. The terminal as claimed in claim 7 wherein said washer comprises a polyester felt.

* * * * *